(12) United States Patent
Lee

(10) Patent No.: US 11,334,188 B2
(45) Date of Patent: May 17, 2022

(54) TOUCH DRIVING DEVICE, RELAY DEVICE AND METHOD FOR IMPLEMENTING TOUCH OF MULTI-VISION

(71) Applicant: SILICON WORKS CO., LTD., Daejeon (KR)

(72) Inventor: Dal Eun Lee, Daejeon (KR)

(73) Assignee: SILICON WORKS CO.. LTD., Daejeon (KR)

( * ) Notice: Subject to any disclaimer, the term of this patent is extended or adjusted under 35 U.S.C. 154(b) by 0 days.

(21) Appl. No.: 16/950,741

(22) Filed: Nov. 17, 2020

(65) Prior Publication Data

US 2021/0191595 A1 Jun. 24, 2021

(30) Foreign Application Priority Data

Dec. 20, 2019 (KR) .......................... 10-2019-0171823

(51) Int. Cl.
*G06F 3/041* (2006.01)
*G06F 3/14* (2006.01)

(52) U.S. Cl.
CPC ........ *G06F 3/04166* (2019.05); *G06F 3/1446* (2013.01)

(58) Field of Classification Search
None
See application file for complete search history.

(56) References Cited

U.S. PATENT DOCUMENTS

| | | | |
|---|---|---|---|
| 10,082,899 B2 | 9/2018 | Chang et al. | |
| 2012/0075213 A1 | 3/2012 | Huang et al. | |
| 2017/0031523 A1* | 2/2017 | Seo | ...................... G06F 3/04166 |
| 2018/0314483 A1* | 11/2018 | Liu | .......................... G09G 5/12 |

FOREIGN PATENT DOCUMENTS

KR 10-2013-0051300 A 5/2013

* cited by examiner

*Primary Examiner* — Carl Adams
(74) *Attorney, Agent, or Firm* — Fenwick & West LLP

(57) ABSTRACT

The present disclosure relates to a relay device, a touch driving device, and a method for implementing a touch function in a multi-vision. In particular, it relates to a relay device, a touch driving device, and a method for implementing a touch function in a multi-vision without problems using a state signal indicating the transmissible state of touch data from each display device of a multi-vision.

10 Claims, 10 Drawing Sheets

TOUCH DRIVING DEVICE, RELAY DEVICE AND METHOD FOR IMPLEMENTING TOUCH OF MULTI-VISION

CROSS REFERENCE TO RELATED APPLICATION

This application claims priority from Republic of Korea Patent Application No. 10-2019-0171823, filed on Dec. 20, 2019, which is hereby incorporated by reference in its entirety.

BACKGROUND

1. Field of Technology

The embodiment relates to a relay device, a touch driving device, and a method for implementing a touch function in a multi-vision.

2. Description of the Prior Art

A multi-vision is a display system that is obtained by combining a plurality of display devices for displaying a single image, and is also referred to as a "video wall system."

In other words, the multi-vision may display an image source as if it were displayed on a single display device by a method in which the entire screen of the image source is divided into several screens for a plurality of display devices and in which the divided screens are individually displayed on the plurality of display devices.

The multi-vision is able to divide and output the entire screen of an image source using a plurality of display devices as described above, so the multi-vision is able to enlarge and display a small image. Here, the image source may be provided from a host connected to the multi-vision.

The host may be implemented as an external device separate from the multi-vision, such as a media player, a desktop computer, or the like, or may be implemented in the form of a system-on-chip (SOC), and may be embedded in any one of the plurality of display devices.

Meanwhile, in recent years, TVs or monitors equipped with a touch function have been released to provide convenience to users. However, the multi-vision configured as a plurality of display devices, rather than a single display device such as a TV or a monitor, is not yet equipped with a touch function.

SUMMARY

The objective of the embodiment, in one aspect, is to provide a technique for implementing a touch function in a multi-vision.

To this end, in an aspect, the present disclosure provides relay device comprising: a first communication interface configured to receive a first state signal to an $N^{th}$ state signal (N is a natural number) respectively from a first touch driving device to an $N^{th}$ touch driving device included in a first display device to an $N^{th}$ display device constituting a multi-vision and receive first display device touch data to $N^{th}$ display device touch data from the first touch driving device to the $N^{th}$ touch driving device; a controller configured to calculate multi-vision touch coordinates, which are touch coordinates for the multi-vision, using the first display device touch data to the $N^{th}$ display device touch data received by the first communication interface; and a second communication interface configured to transmit the multi-vision touch coordinates to a controller of a host, wherein a time of receiving each of the first display device touch data to the $N^{th}$ display device touch data varies depending on the first state signal to the $N^{th}$ state signal.

One of the first state signal to the $N^{th}$ state signal may be a signal in which a disable signal, output from one touch driving device in a touch driving time of the one touch driving device, and an enable signal, output from the one touch driving device in a time other than the touch driving time, alternate.

The first communication interface may receive one piece of display device touch data from the one touch driving device when receiving the enable signal of the one state signal.

The controller may transmit a touch data request signal to the one touch driving device through the first communication interface and then receive the one piece of display device touch data, and wherein the touch data request signal is transmitted to the one touch driving device at a time where the disable signal of the one state signal switches to the enable signal.

The first communication interface may comprise a plurality of external input/output terminals for receiving the first state signal to the $N^{th}$ state signal and a plurality of serial peripheral interface (SPI) terminals for receiving the first display device touch data to the $N^{th}$ display device touch data.

The communication interface may comprise a plurality of SPI terminals for receiving the first state signal to the $N^{th}$ state signal and for receiving the first display device touch data to the $N^{th}$ display device touch data.

In another aspect, the present disclosure provides a touch driving device comprising: a touch driving unit configured to supply a driving signal to a sensor electrode of a touch panel comprised in one display device, which is an element of a multi-vision, to receive a response signal to the driving signal from the sensor electrode, and to generate raw data; and a microcontroller configured to calculate display device touch data, which is touch data for the one display device, using the raw data, to transmit the display device touch data to a relay device that calculates multi-vision touch coordinates, which are touch coordinates for the multi-vision, using the display device touch data, to alternately output a disable signal that is output in a touch driving time including a time for calculating the touch data and an enable signal that is output at a time other than the touch driving time, and to transmit the disable signal and the enable signal to the relay device.

The microcontroller may transmit the display device touch data to the relay device when transmitting the enable signal to the relay device.

The microcontroller may comprise an external input/output terminal for alternately transmitting the disable signal and the enable signal to the relay device and a serial peripheral interface (SPI) terminal for transmitting the display device touch data to the relay device when transmitting the enable signal to the relay device.

The microcontroller may comprise an SPI terminal for alternately transmitting the disable signal and the enable signal to the relay device and for transmitting the display device touch data to the relay device when transmitting the enable signal.

The microcontroller may output the disable signal and the enable signal in every frame of the display device.

The touch driving time may further comprise a time for generating the raw data by the touch driving unit.

The display device touch data may comprise touch coordinate information on the one display device.

In still another aspect, the present disclosure provides a method for implementing a touch function in a multi-vision, the method comprising: a state signal transmission step of transmitting a first state signal to an $N^{th}$ state signal (N is a natural number) from a first touch driving device to an $N^{th}$ touch driving device, included in a first display device to an $N^{th}$ display device constituting a multi-vision, to a relay device; a state identification step of identifying an enable state or a disable state of each of the first touch driving device to the $N^{th}$ touch driving device using the first state signal to the $N^{th}$ state signal; a data transmission step of transmitting, to the relay device, first display device touch data to $N^{th}$ display device touch data from the first touch driving device to the $N^{th}$ touch driving device, wherein each of the first through the $N^{th}$ touch driving devices transmits touch data when it is in the enable state; a step of calculating multi-vision touch coordinates, which are touch coordinates for the multi-vision, by the relay device using the first display device touch data to the $N^{th}$ display device touch data; and a step of transmitting the multi-vision touch coordinates by the relay device to a host.

In the data transmission step, a touch driving device in the enable state, among the first through the $N^{th}$ touch driving devices may transmit display device touch data to the relay device when it receives a touch data request signal from the relay device.

As described above, according to the embodiment, since respective display devices of a multi-vision output a state signal indicating the transmissible state of touch data and transmit the same to a relay device of a host, the relay device is able to wait until the touch data is received from the respective display devices of the multi-vision, thereby easily implementing a touch function in the multi-vision.

BRIEF DESCRIPTION OF THE DRAWINGS

The above and other aspects, features and advantages of the present disclosure will be more apparent from the following detailed description taken in conjunction with the accompanying drawings, in which.

DETAILED DESCRIPTION

Figure 1:
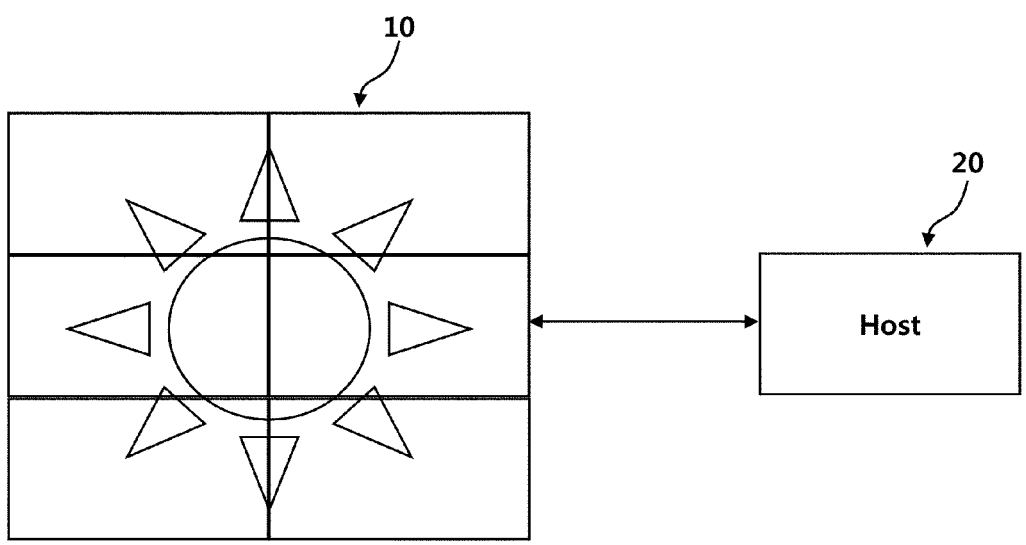
FIG. 1 is a diagram schematically illustrating a multi-vision system according to an embodiment.

FIG. 1 is a diagram schematically illustrating a multi-vision system according to an embodiment.

Referring to FIG. 1, a multi-vision system 1 may include a multi-vision 10 and a host 20.

Here, the multi-vision 10 may include a plurality of display devices, that is, a first display device to an $N^{th}$ display device (N is a natural number of 2 or more), may receive an image source from the host 20, and may divide the entire screen of the image source, thereby displaying the same on the first display device to the $N^{th}$ display device as shown in FIG. 1. Here, the host 20 may be implemented as a media player, a desktop computer, or the like.

Figure 2:
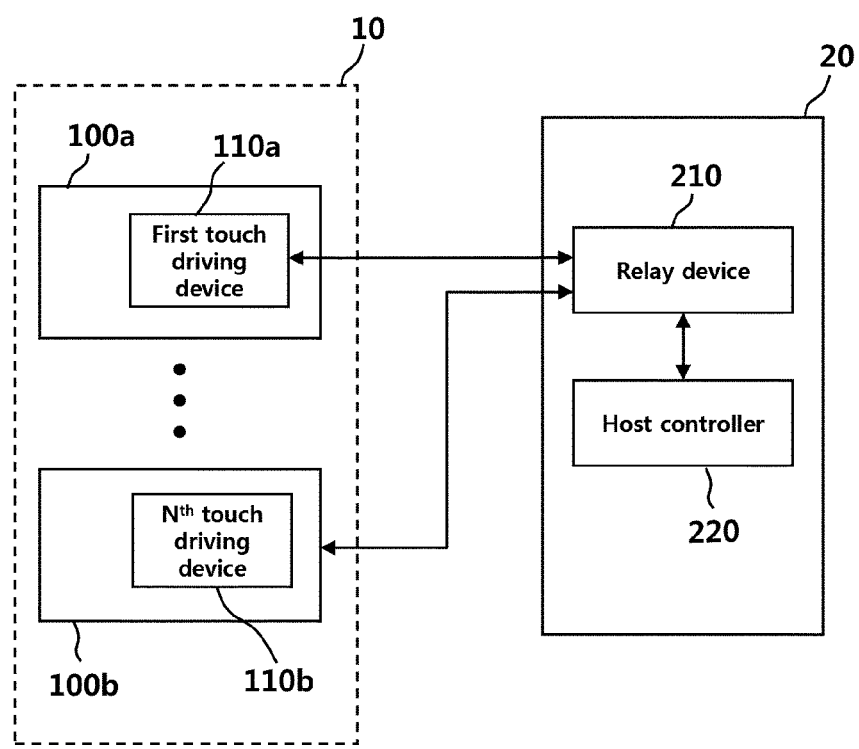
FIG. 2 is a diagram illustrating the configuration of a multi-vision system according to an embodiment.

The multi-vision 10 and the host 20 may include the elements shown in FIG. 2.

FIG. 2 is a diagram illustrating the configuration of a multi-vision system according to an embodiment.

Referring to FIG. 2, the multi-vision 10 may include a first display device 100a to an $N^{th}$ display device 100b, and the host 20 may include a relay device 210 and a host controller 220.

In an embodiment, the first display device 100a to the $N^{th}$ display device 100b may include a first touch driving device 110a to an $N^{th}$ touch driving device 110b, and may further include a first touch panel (not shown) to an $N^{th}$ touch panel (not shown). In other words, each of the display devices constituting the multi-vision 10 may include a touch driving device, and may further include a touch panel.

Here, the first touch driving device 110a to the $N^{th}$ touch driving device 110b may generate first display device touch data to $N^{th}$ display device touch data, and may transmit the same to the relay device 210.

Figure 5:
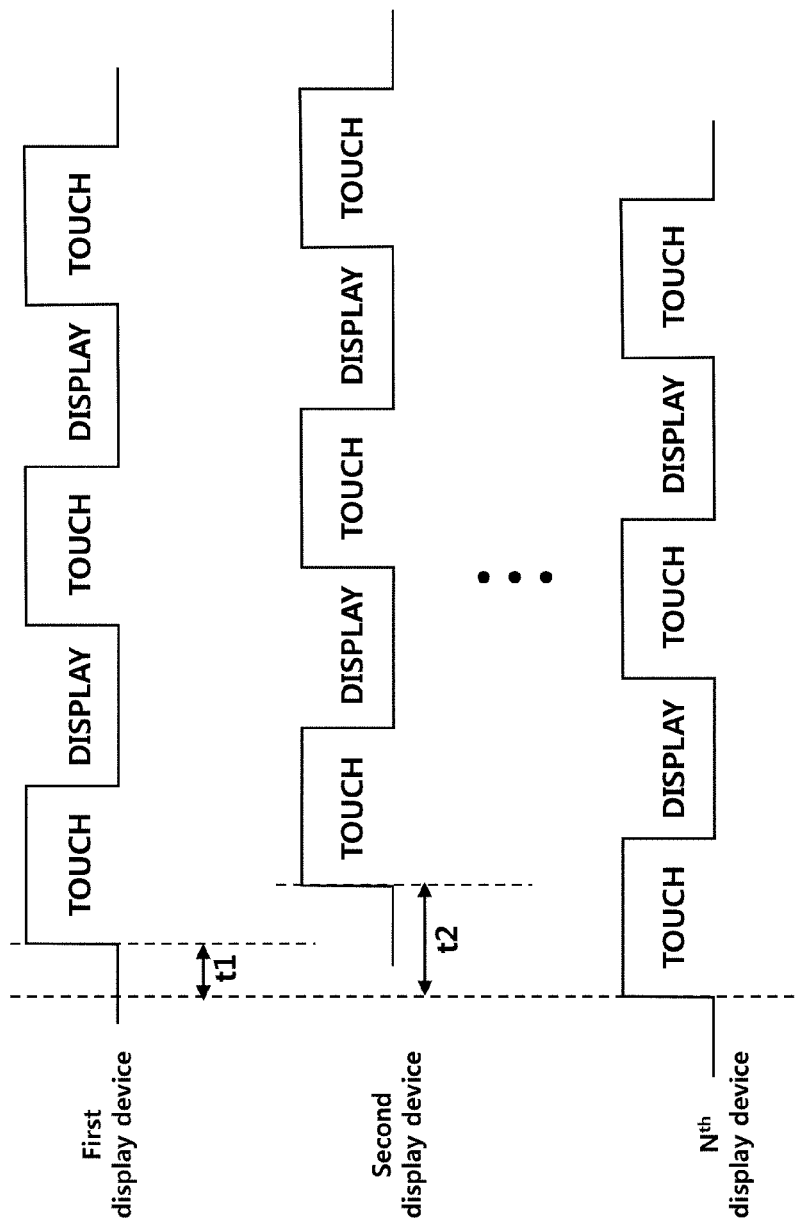
FIG. 5 is a diagram illustrating a driving method of a plurality of display devices forming a multi-vison according to an embodiment.

In an embodiment, the first display device 100a to the $N^{th}$ display device 100b may perform touch driving and image output by a time division method as shown in FIG. 5.

Here, even if the first display device 100a to the $N^{th}$ display device 100b are the same product, the processing speed may differ between the display devices depending on the difference in internal parts or the like, and thus touch driving times of the first display device 100a to the $N^{th}$ display device 100b may be different from each other.

For example, if the $N^{th}$ display device 100b has the highest processing speed as shown in FIG. 5, according to the processing speeds of the display devices, the first display device 100a may start touch driving after a first time t1 from the touch driving time of the $N^{th}$ display device 100b, and the second display device may start touch driving after a second time t2 from the touch driving time of the $N^{th}$ display device 100b.

As described above, in the case where there are differences in the processing speed between the display devices of the multi-vision 10, the touch driving time of the touch driving device included in the display device may differ between the display devices, and the time at which the touch driving device transmits touch data to the relay device 210 may differ between the display devices.

If the second time t2 exceeds a predetermined time in the state in which the relay device 210 is configured to calculate touch coordinates after receiving the first display device touch data to the $N^{th}$ display device touch data within a predetermined time, the second display device may transmit the touch data to the relay device 210 after the predetermined time. In this case, the relay device 210 is unable to perform normal calculation of the touch coordinates, thereby erroneously determining that there is a problem with a touch function of the multi-vision 10.

In an embodiment, in order to solve the above problems, a touch driving device and a relay device having the following configurations are provided.

First, a detailed description of a touch driving device included in each of a plurality of display devices in an embodiment is as follows.

Figure 3:
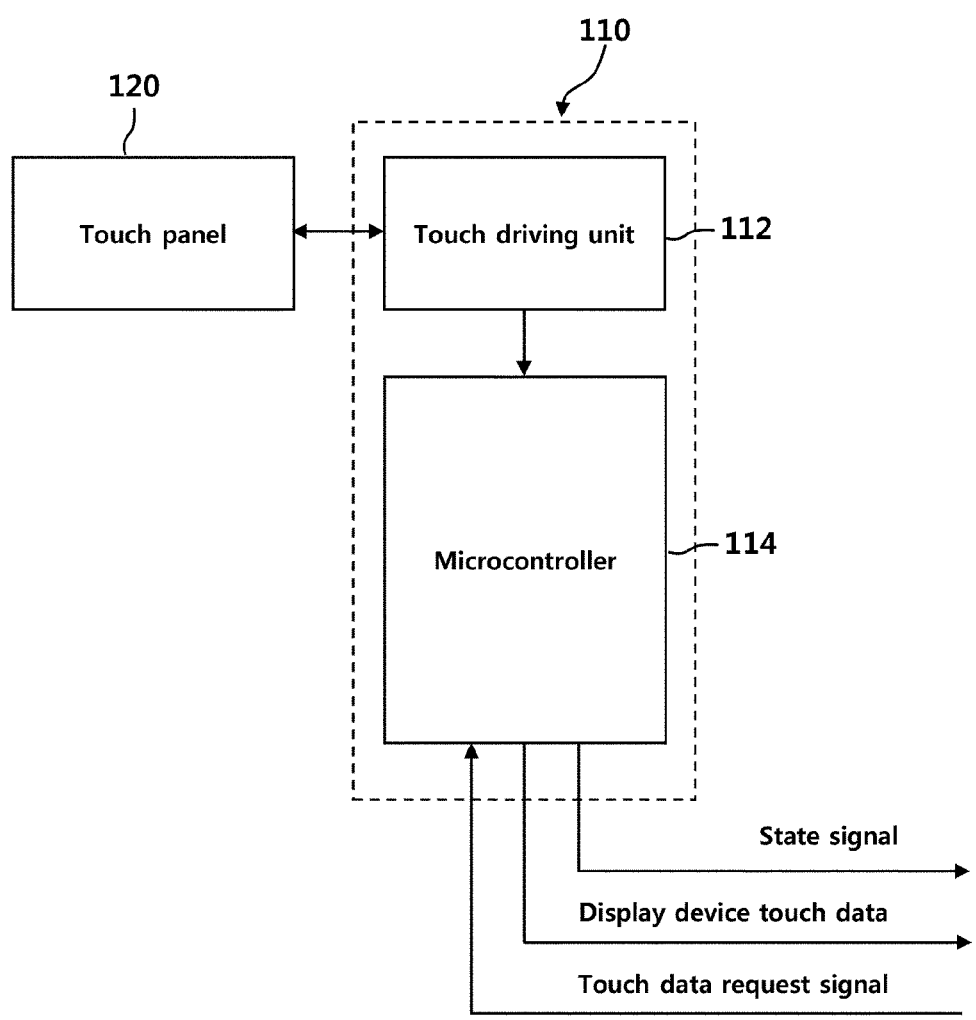
FIG. 3 is a diagram illustrating the configuration of a touch driving device included in a display device of a multi-vision according to an embodiment.

FIG. 3 is a diagram illustrating the configuration of a touch driving device included in a display device of a multi-vision according to an embodiment.

A touch driving device 110 according to an embodiment may include a touch driving unit 112 and a microcontroller 114.

The touch driving unit 112 may supply a driving signal to a sensor electrode of a touch panel 120 comprised in the display device, may receive a response signal to the driving signal from the sensor electrode, and may generate raw data on the touch panel 120, i.e., raw data on the display device.

Here, if there is an object that is approaching or touching one point of the touch panel 120, the touch driving unit 112 may receive a response signal having a high intensity from a sensor electrode disposed at one point of the touch panel 120. According thereto, raw data on the object approaching or touching one point of the touch panel 120 may be generated.

Meanwhile, the touch panel 120 may be bonded on an upper polarizing plate constituting a display panel (not shown) of the display device, or may be formed between an upper polarizing plate and an upper substrate. In addition, in the case where the touch panel 120 is formed by an in-cell type, the touch panel may be formed on a lower substrate together with a pixel array in a display panel (not shown).

The touch panel 120 may include sensor electrodes including driving electrodes and receiving electrodes.

The microcontroller 114 may calculate touch data on the touch panel 120, i.e., display device touch data, which is touch data for one display device, using the raw data generated by the touch driving unit 112, and may transmit the same to the relay device 210. Here, the display device touch data may include touch coordinates for one display device.

In an embodiment, the microcontroller 114 may alternately output a disable signal that is output in a touch driving time including the time for calculating display device touch data and an enable signal that is output in a time other than the touch driving time, and may transmit the same to the relay device 210.

In other words, the microcontroller 114 may output a state signal that is generated by alternating a disable signal output in a touch driving time and an enable signal output in a time other than the touch driving time, and may transmit the same to the relay device 210.

Figure 6:
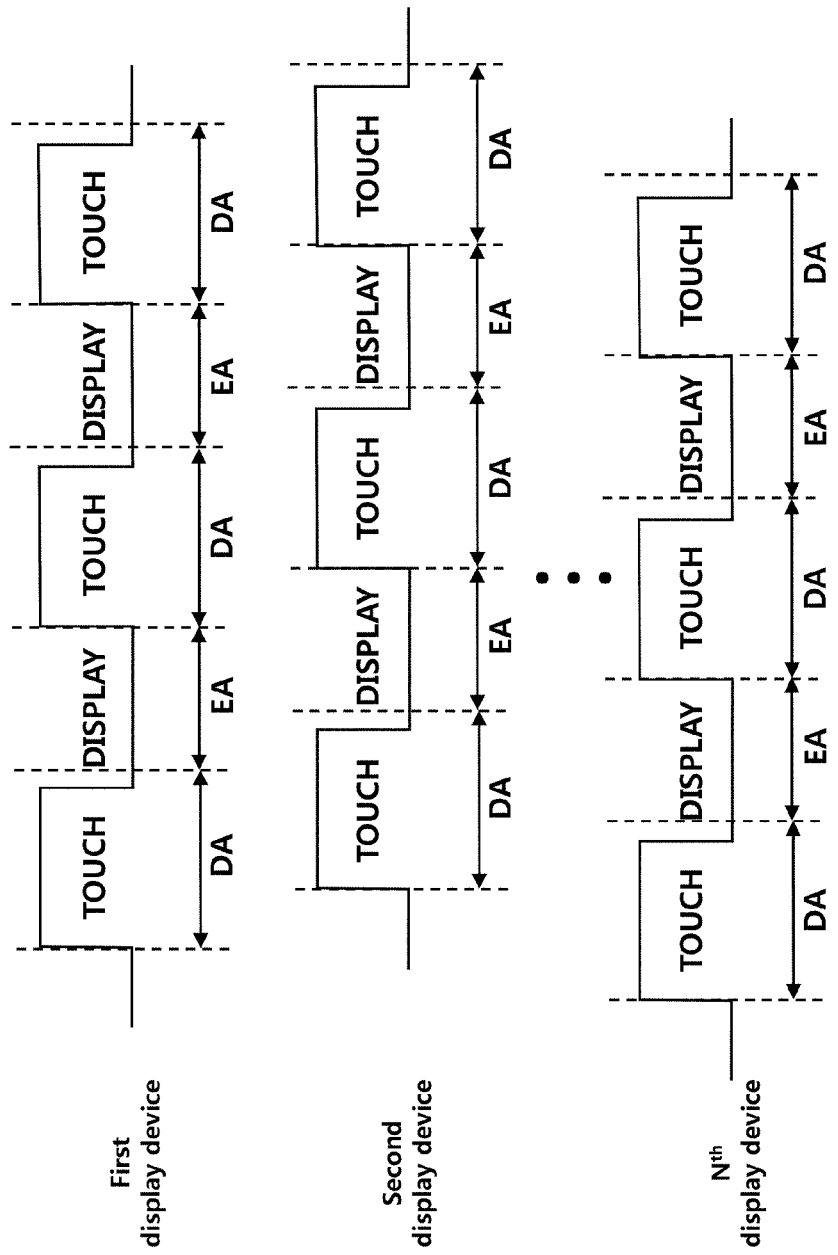
FIG. 6 and FIG. 7 are diagrams illustrating a method of generating a state signal in a touch driving device according to an embodiment.

For example, if the touch driving device 110 is the first touch driving device 110a included in the first display device 100a, the microcontroller 114 may configure the touch driving time as the time of outputting a disable signal DA, and may configure the time other than the touch driving time, i.e., an image output time, as the time of outputting an enable signal EA, as shown in FIG. 6. Here, since the touch driving time may include the time for which the microcontroller 114 calculates the display device touch data, the touch driving time may exceed a time period ("TOUCH" period) in which the touch driving unit 112 of the first display device 100a is driven, as shown in FIG. 6.

Meanwhile, the touch driving time may further include the time for which the touch driving unit 112 generates raw data.

In addition, the microcontroller 114 may output a disable signal and an enable signal in every frame of the display device (the "TOUCH" period and the "DISPLAY" period in FIG. 6).

Figure 7:
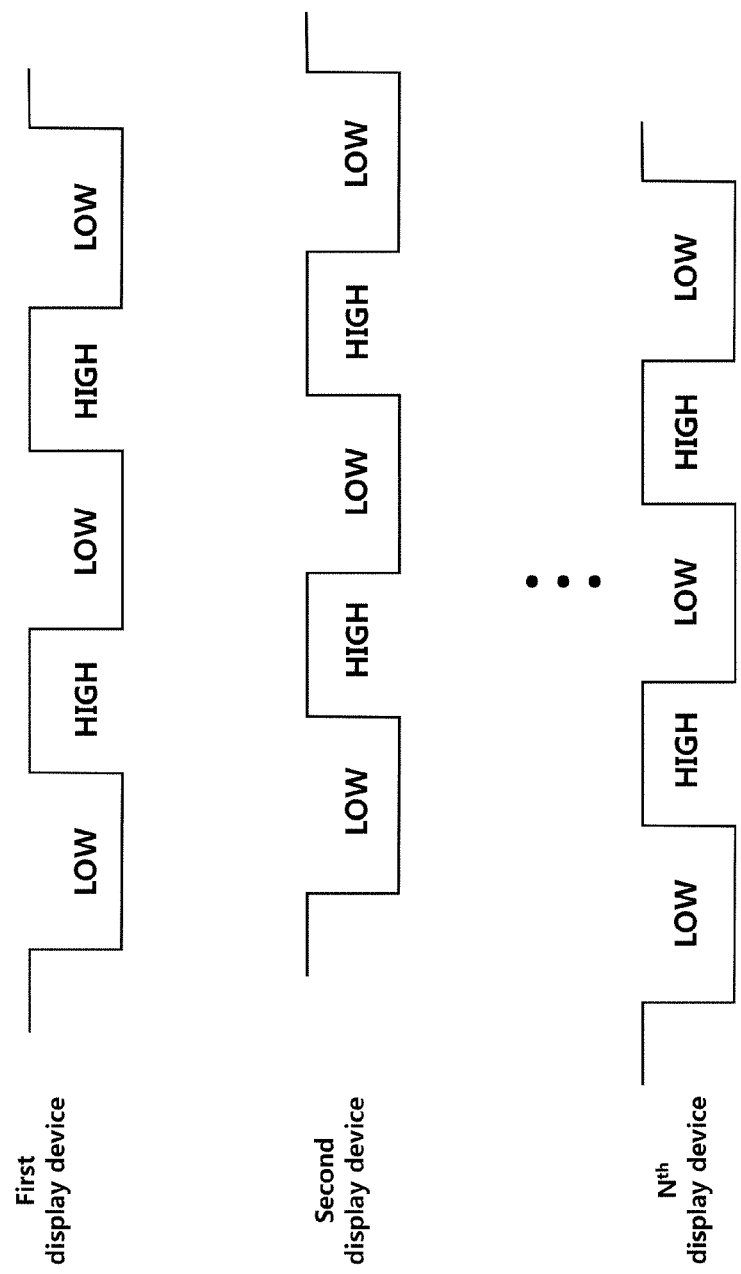

The microcontroller 114 may output a disable signal as a low-level signal, and may output an enable signal as a high-level signal as shown in FIG. 7.

In an embodiment, the disable signal indicates the state in which the microcontroller 114 is unable to transmit display device touch data to the relay device 210, and the enable signal indicates the state in which the microcontroller 114 is able to transmit display device touch data to the relay device 210.

Here, the microcontroller 114 is unable to transmit display device touch data to the relay device 210 because the microcontroller 114 receives raw data from the touch driving unit 112 during the touch driving time and calculates the display device touch data.

In addition, since the calculation of display device touch data by the microcontroller 114 is completed in the time other than the touch driving time, the microcontroller 114 is able to transmit the display device touch data to the relay device 210.

When the microcontroller 114 transmits the state signal to the relay device 210 as described above, the relay device 210 may wait until the display device switches to an enable state.

Meanwhile, when transmitting an enable signal to the relay device 210, if a state signal is an enable signal, the microcontroller 114 may transmit display device touch data to the relay device 210.

To this end, the microcontroller 114 may include an external input/output terminal (not shown) for alternately transmitting a disable signal and an enable signal to the relay device 210 and a serial peripheral interface (SPI) terminal (not shown) for transmitting touch display device touch data to the relay device 210 when transmitting an enable signal to the relay device 210.

In addition, the microcontroller 210 may include only an SPI terminal (not shown), and may transmit display device touch data to the relay device 210 when transmitting the enable signal while alternately transmitting the disable signal and the enable signal to the relay device 210 through the SPI terminal.

Hereinafter, the relay device 210 that is an element of the host 20 will be described.

Figure 4:
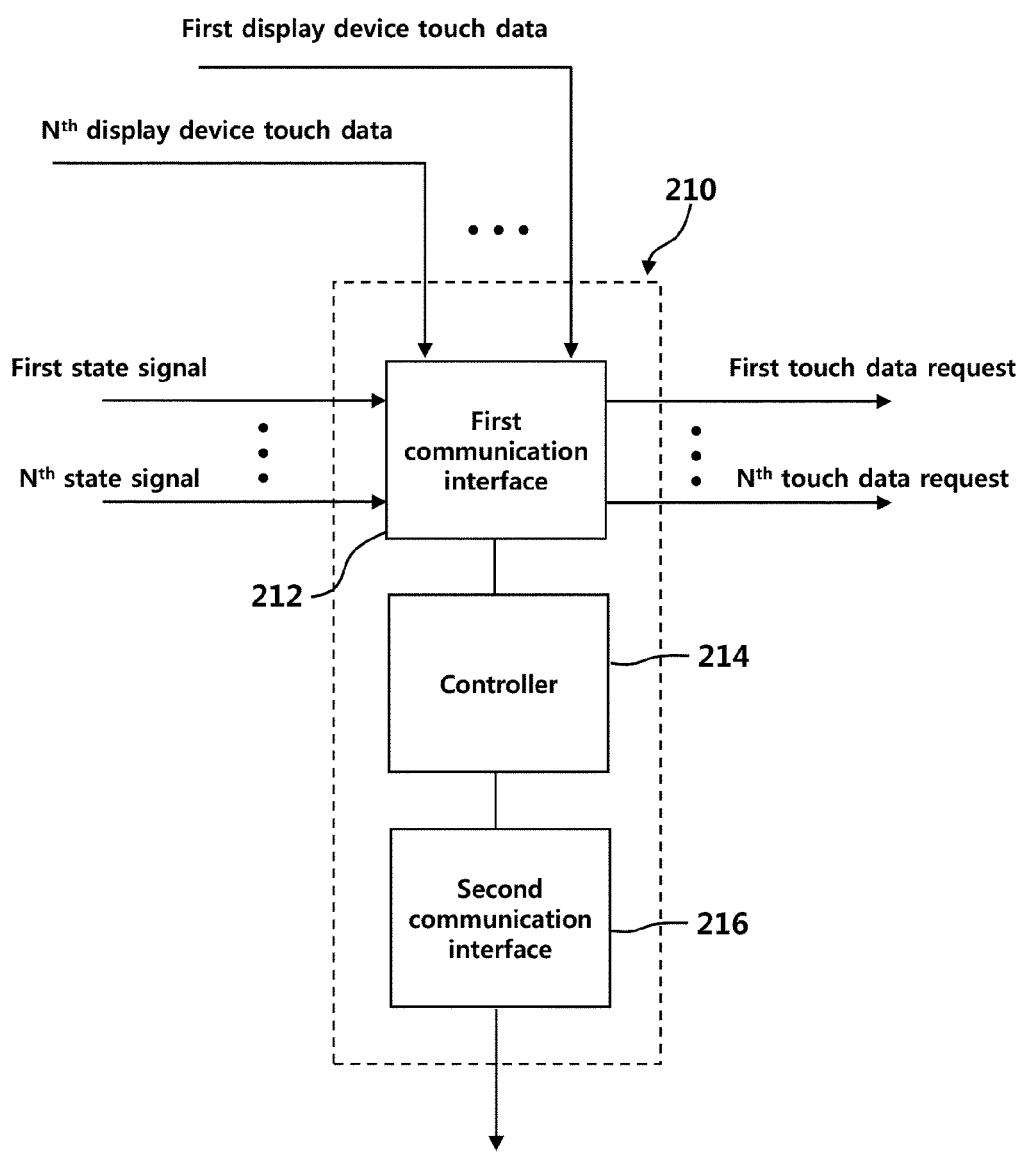
FIG. 4 is a diagram illustrating the configuration of a relay device 210 according to an embodiment.

FIG. 4 is a diagram illustrates the configuration of a relay device 210 according to an embodiment.

Referring to FIG. 4, the relay device 210 may include a first communication interface 212, a controller 214, and a second communication interface 216.

The first communication interface 212 may receive a first state signal to an $N^{th}$ state signal from the first touch driving device 110a to the $N^{th}$ touch driving device 110b included in the first display devices 100a to the $N^{th}$ display devices 100b constituting the multi-vision 10.

In addition, the first communication interface 212 may receive first display device touch data to $N^{th}$ display device touch data from the first touch driving device 110a to the $N^{th}$ touch driving device 110b.

Here, the reception times of the first display device touch data to the $N^{th}$ display device touch data may vary depending on the first state signal to the $N^{th}$ state signal.

Figure 8:
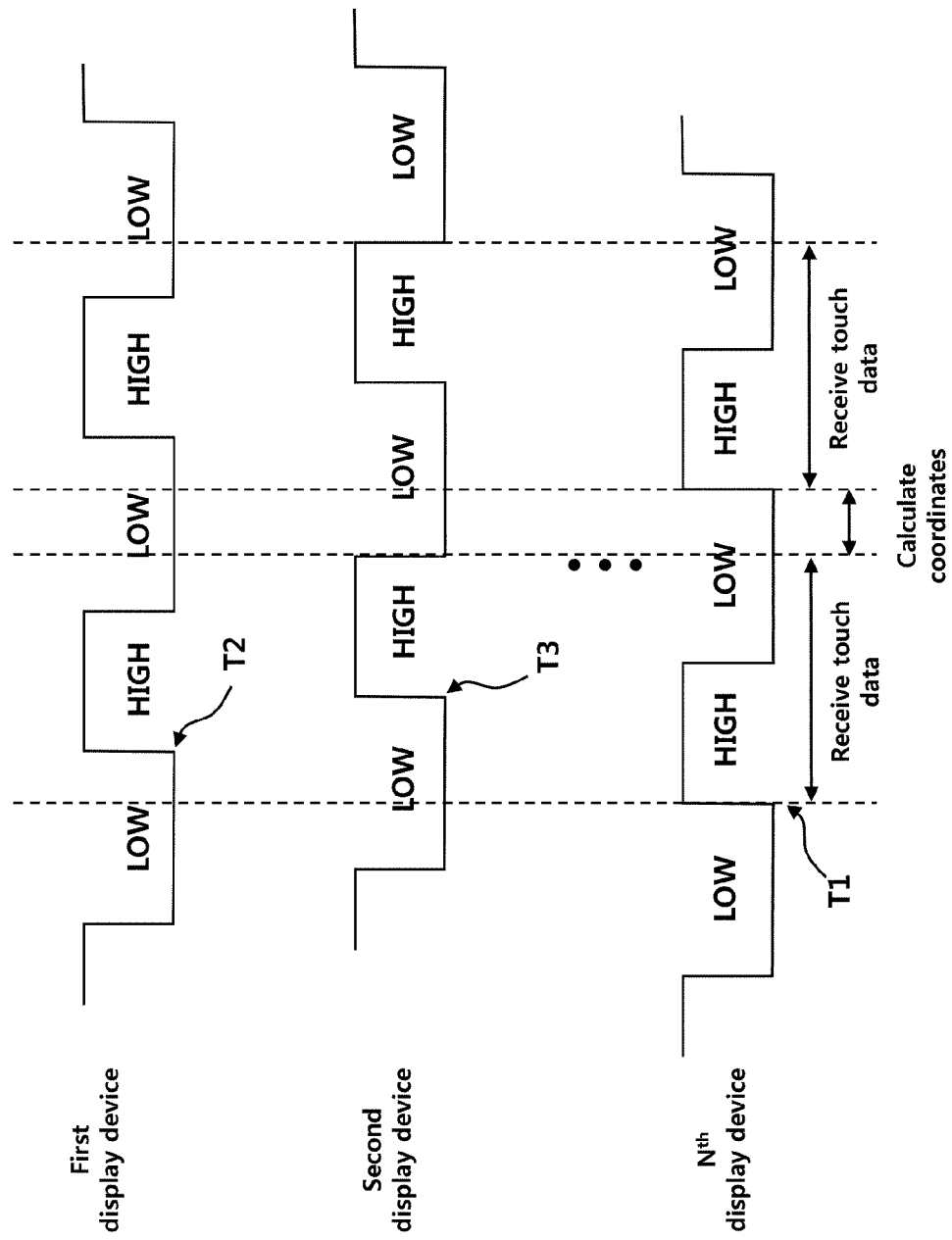
FIG. 8 is a diagram illustrating a time point when multi-vision touch coordinates of are generated in a relay device according to an embodiment.

For example, in FIG. 8, since the $N^{th}$ state signal switches to an enable signal at a first time T1, the first communication interface 212 receives the $N^{th}$ display device touch data from the $N^{th}$ touch driving device 110b at the first time T1, and since the first state signal switches to an enable signal at a second time T2 after the first time T1, the first communication interface 212 receives the first display device touch data from the first touch driving device 110a at the second time T2.

The first communication interface 212 may receive display device touch data from the touch driving device when receiving the enable signal of the state signal as described above.

The first communication interface 212 may include a plurality of external input/output terminals (not shown) for receiving the first state signal to the $N^{th}$ state signal and a plurality of serial peripheral interface (SPI) terminals (not shown) for receiving the first display device touch data to the $N^{th}$ display device touch data.

In addition, the first communication interface 212 may include only a plurality of SPI terminals (not shown), may receive the first state signal to the $N^{th}$ state signal through a plurality of SPI terminals, and may receive the first display device touch data to the $N^{th}$ display device touch data.

The controller 214 may calculate multi-vision touch coordinates, which are touch coordinates of the multi-vision 10, using the first display device touch data to the $N^{th}$ display device touch data received by the first communication interface 212.

For example, the controller 214 may store a multi-vision touch coordinate map that is a touch coordinate map for the entire screen of the multi-vision 10 and a touch coordinate map for each display device matched to the multi-vision touch coordinate map.

Accordingly, the controller 214 may extract touch coordinate information on each display device from the first display device touch data to the $N^{th}$ display device touch data, and may calculate touch coordinate information on each display device as multi-vision touch coordinates using the multi-vision touch coordinate map.

The controller 214 calculating the multi-vision touch coordinates as described above may transmit the multi-vision touch coordinates to the host controller 220 through the second communication interface 216. Here, the second communication interface 216 may include a universal serial bus (USB) terminal.

Meanwhile, in an embodiment, the controller 214 may identify the first state signal to the $N^{th}$ state signal, and may wait until display device touch data is received from the touch driving device that enters the enable state last, among the first touch driving device 110a to the $N^{th}$ touch driving device 110b.

For example, as shown in FIG. 8, the controller 214 may wait until the enable time of second display device, which is the latest time, from the enable time of the $N^{th}$ display device, which is the earliest time, and may receive the first display device touch data to the $N^{th}$ display device touch data, thereby calculating multi-vision touch coordinates.

In other words, even if there is one touch driving device having an enable time with large intervals from the enable times of other touch driving devices due to the difference in the processing speed between the display devices, among the first touch driving devices 110a to the $N^{th}$ touch driving device 110b, the controller 214 may wait until the enable time of the one touch driving device. Therefore, it is possible to easily implement a touch function in the multi-vision 10.

Figure 9:
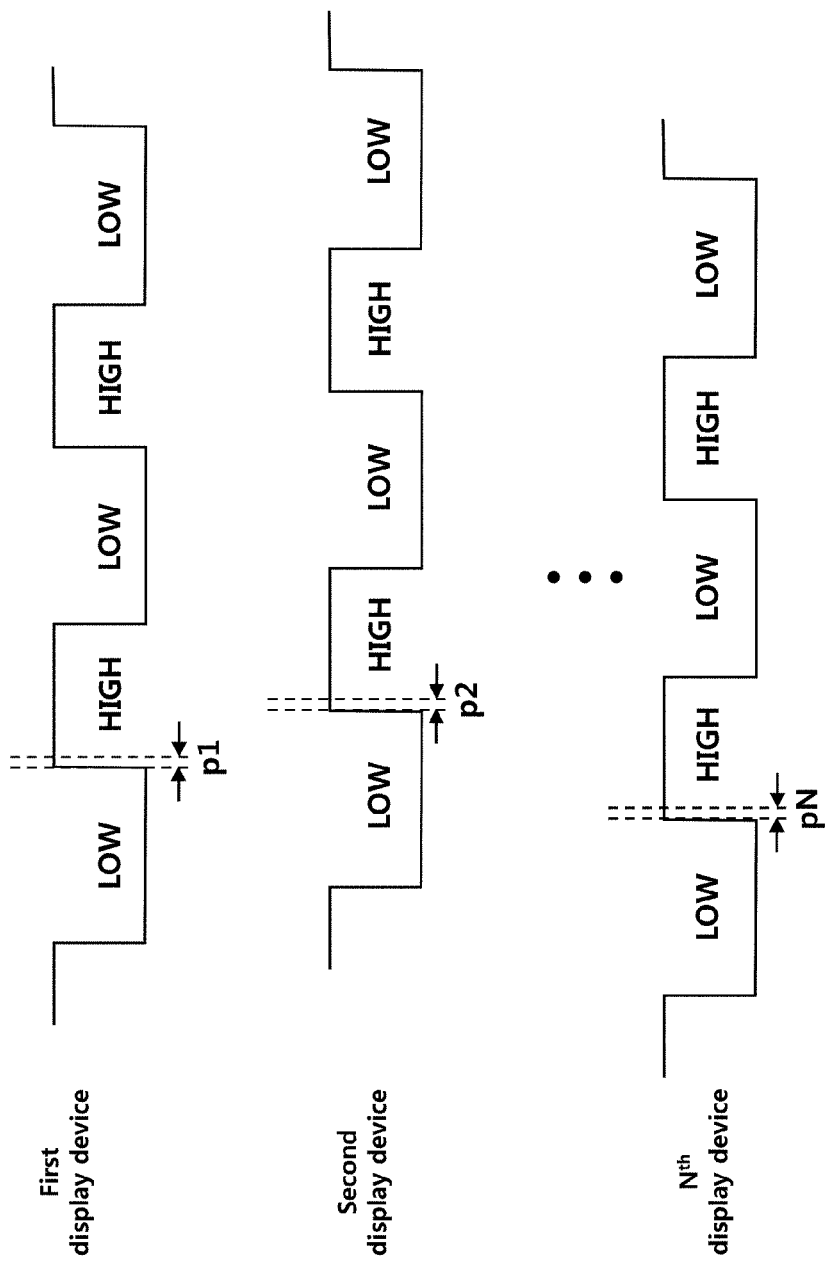
FIG. 9 is a diagram illustrating a time point when a relay device according to an embodiment requests touch data from a plurality of display devices.

Meanwhile, the controller 214 may transmit a touch data request signal to the touch driving device through the first communication interface 212, and may receive display device touch data. Here, the controller 214 may transmit a touch data request signal to the touch driving device at times p1, p2, and pN at which the disable signal of the state signal switches to the enable signal as shown in FIG. 9.

As described above, in an embodiment, since the respective display devices of the multi-vision 10 output state signals indicating the transmissible state of display device touch data and transmit the same to the relay device 210 of the host 20, the relay device 210 may wait until the touch data is received from the respective display devices of the multi-vision 10, thereby easily implementing a touch function in the multi-vision 10.

Hereinafter, a process of implementing a touch function in the multi-vision system 1 will be described.

Figure 10:
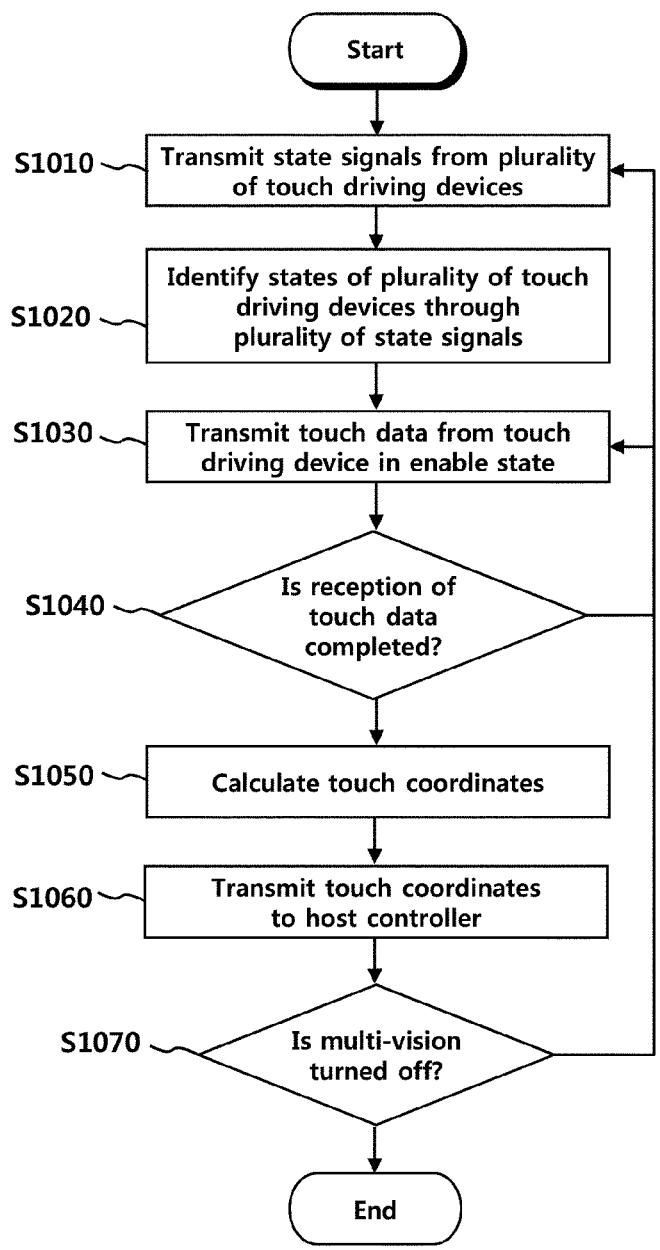
FIG. 10 is a flowchart illustrating a process of implementing a touch function in a multi-vision system according to an embodiment.

FIG. 10 is a flowchart illustrating a process of implementing a touch function in a multi-vision system according to an embodiment.

Referring to FIG. 10, a first touch driving device 110a to an $N^{th}$ touch driving device 110b transmit a first state signal to an $N^{th}$ state signal to the relay device 210 (S1010).

The relay device 210 may identify whether the first touch driving device 110a to the $N^{th}$ touch driving device 110b are in an enable state or a disable state using the first state signal to the $N^{th}$ state signal (S1020).

In addition, the first touch driving device 110a to the $N^{th}$ touch driving device 110b may transmit first display device touch data to $N^{th}$ display device touch data to the relay device 210, and may transmit display device touch data to the relay device 210 when the touch driving device is in the enable state (S1030).

According thereto, the relay device 210 may receive the first display device touch data to the $N^{th}$ display device touch data at different times according to the first state signal to the $N^{th}$ state signal, and may calculate multi-vision touch coordinates after completing the reception of the first display device touch data to the $N^{th}$ display device touch data (S1040 and S1050).

Thereafter, the relay device 210 may transmit the multi-vision touch coordinates to the host controller 220 (S1060). Here, the host controller 220 may display an event for the multi-vision touch coordinates on the screen of the multi-vision 10.

The multi-vision system 1 may repeat the steps S1010 to S1060 until the multi-vision is turned off.

What is claimed is:

1. A relay device comprising:
   a first communication interface configured to receive a first state signal to an $N^{th}$ state signal (N is a natural number) respectively from a first touch driving device to an $N^{th}$ touch driving device included in a first display device to an $N^{th}$ display device constituting a multi-vision and receive first display device touch data to $N^{th}$ display device touch data from the first touch driving device to the $N^{th}$ touch driving device;
   a controller configured to calculate multi-vision touch coordinates, which are touch coordinates for the multi-vision, using the first display device touch data to the $N^{th}$ display device touch data received by the first communication interface; and
   a second communication interface configured to transmit the multi-vision touch coordinates to a controller of a host,
   wherein a time of receiving each of the first display device touch data to the $N^{th}$ display device touch data varies depending on the first state signal to the $N^{th}$ state signal,
   wherein one of the first state signal to the $N^{th}$ state signal is a signal in which a disable signal, output from one touch driving device in a touch driving time of the one touch driving device, and an enable signal, output from the one touch driving device in a time other than the touch driving time, alternate, wherein the controller is configured to transmit a touch data request signal to the one touch driving device through the first communication interface and then receive one piece of display device touch data, and wherein the touch data request signal is transmitted to the one touch driving device at a time where the disable signal of the one state signal switches to the enable signal, wherein the one piece of display device touch data comprises touch coordinate information on the one display device.

2. The relay device of claim 1, wherein the first communication interface comprises a plurality of external input/output terminals for receiving the first state signal to the $N^{th}$ state signal and a plurality of serial peripheral interface (SPI) terminals for receiving the first display device touch data to the $N^{th}$ display device touch data.

3. The relay device of claim 1, wherein the first communication interface comprises a plurality of SPI terminals for receiving the first state signal to the $N^{th}$ state signal and for receiving the first display device touch data to the $N^{th}$ display device touch data.

4. A touch driving device comprising:

a touch driving unit configured to supply a driving signal to a sensor electrode of a touch panel comprised in one display device, which is an element of a multi-vision, to receive a response signal to the driving signal from the sensor electrode, and to generate raw data; and a microcontroller configured to calculate display device touch data, which is touch data for the one display device, using the raw data, to transmit the display device touch data to a relay device that calculates multi-vision touch coordinates, which are touch coordinates for the multi-vision, using the display device touch data, to alternately output a disable signal, that is output in a touch driving time including a time for calculating the touch data, and an enable signal, that is output in a time other than the touch driving time, and to transmit the disable signal and the enable signal to the relay device, wherein the microcontroller transmits the display device touch data according to a touch data request signal received after a time where the disable signal has switched to the enable signal, wherein the display device touch data comprises touch coordinate information on the one display device.

5. The touch driving device of claim 4, wherein the microcontroller transmits the display device touch data to the relay device when transmitting the enable signal to the relay device.

6. The touch driving device of claim 4, wherein the microcontroller comprises an external input/output terminal for alternately transmitting the disable signal and the enable signal to the relay device and a serial peripheral interface (SPI) terminal for transmitting the display device touch data to the relay device when transmitting the enable signal to the relay device.

7. The touch driving device of claim 4, wherein the microcontroller comprises a serial peripheral interface (SPI) terminal for alternately transmitting the disable signal and the enable signal to the relay device and for transmitting the display device touch data to the relay device when transmitting the enable signal.

8. The touch driving device of claim 4, wherein the microcontroller outputs the disable signal and the enable signal in every frame of the display device.

9. The touch driving device of claim 4, wherein the touch driving time further comprises a time for generating the raw data by the touch driving unit.

10. A method for implementing a touch function in a multi-vision, the method comprising:

a state signal transmission step of transmitting a first state signal to an $N^{th}$ state signal (N is a natural number) from a first touch driving device to an $N^{th}$ touch driving device, included in a first display device to an $N^{th}$ display device constituting the multi-vision, to a relay device;

a state identification step of identifying an enable state or a disable state of each of the first touch driving device to the $N^{th}$ touch driving device using the first state signal to the $N^{th}$ state signal;

a data transmission step of transmitting, to the relay device, first display device touch data to $N^{th}$ display device touch data from the first touch driving device to the $N^{th}$ touch driving device, wherein each of the first through the $N^{th}$ touch driving devices transmits touch data when it is in the enable state;

a step of calculating multi-vision touch coordinates, which are touch coordinates for the multi-vision, by the relay device using the first display device touch data to the $N^{th}$ display device touch data; and a step of transmitting the multi-vision touch coordinates by the relay device to a host, wherein, in the data transmission step, a touch driving device in the enable state, among the first touch driving device through the $N^{th}$ touch driving device, transmits display device touch data to the relay device when it receives a touch data request signal from the relay device, wherein each piece of display device touch data comprises touch coordinate information on each display device.

* * * * *